I. W. ROBERTSON.
METHOD OF AND APPARATUS FOR SHAPING PLASTIC SHEETS.
APPLICATION FILED MAR. 7, 1917.
1,270,873.
Patented July 2, 1918.
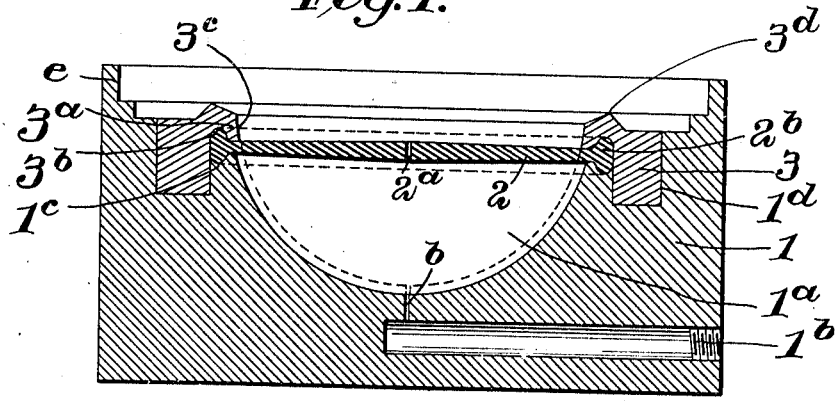
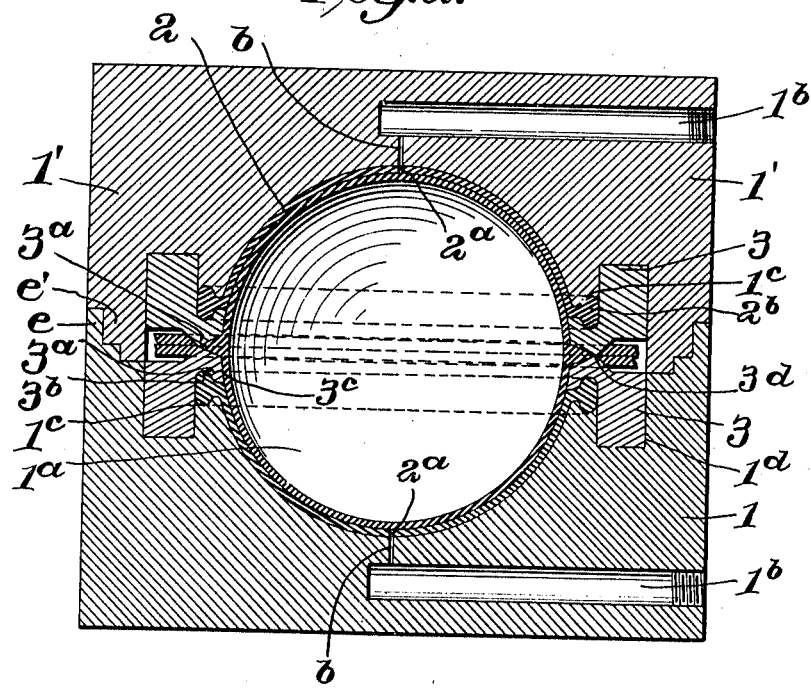
Inventor:
Issac W. Robertson,
by Spear Middleton Donaldson Spear
Atty's.

UNITED STATES PATENT OFFICE.

ISAAC W. ROBERTSON, OF AKRON, OHIO.

METHOD OF AND APPARATUS FOR SHAPING PLASTIC SHEETS.

1,270,873.   Specification of Letters Patent.   Patented July 2, 1918.

Application filed March 7, 1917. Serial No. 153,091.

*To all whom it may concern:*

Be it known that I, ISAAC W. ROBERTSON, a citizen of the United States, and resident of Akron, Ohio, have invented certain new and useful Improvements in Methods of and Apparatus for Shaping Plastic Sheets, of which the following is a specification.

My present invention relates to improvements in method of and means for shaping articles of plastic material and is designed more especially for use in the manufacture of hollow articles of plastic material, such for example as hollow rubber balls.

The invention has among its objects the provision of a method and means by which the articles may be formed up or shaped from sheet material without producing variations or inequalities in the thickness of the material and the invention includes the novel method and apparatus hereinafter described, the said invention being defined by the appended claims.

In order that my invention may be better understood I have appended hereto a sheet of drawings in which I have shown for convenience mold sections adapted for the production of a hollow rubber ball.

In this drawing,

Figure 1 is a sectional view through a single mold section, and

Fig. 2 is a similar view of two mating mold sections brought together to form the complete ball.

Referring by reference character to this drawing the numeral 1 designates a mold section or block having a cavity 1ª which, where the article to be formed by this mold section is the half of a ball of substantially hemispherical shape. This mold cavity is in communication by a minute passage $b$ with a passage 1ᵇ, which is adapted to be connected in any suitable manner with a suction apparatus not shown, a convenient manner of effecting such connection being to thread the interior wall of the passage at its outer end, as shown, to permit of the attachment thereto of a flexible eduction pipe, also not shown.

This suction passage is for the purpose of drawing a sheet of plastic material down into the cavity of the mold section by the unbalanced pressure produced by the suction on one side and the atmospheric pressure on the other. One objection to methods heretofore employed is the tendency of such suction to stretch the uncured sheet unequally and thereby make some parts thinner than other parts.

To avoid this objection I clamp across the mouth of the cavity a diaphragm of elastic material adapted to support the sheet while it is being drawn down into the cavity.

I prefer to make this diaphragm of material which is pervious to air so that the sheet will be held snugly against the surface of the supporting diaphragm by the unbalanced air pressure and the diaphragm which I have found most convenient and effective is one made of vulcanized rubber, as indicated at 2, having one or more perforations as indicated at 2ª. When this rubber diaphragm is clamped across the mouth of the mold cavity and suction is applied to the interior of the cavity the diaphragm by reason of its elasticity stretches and is caused by the unbalanced pressure to conform exactly to the interior of the mold cavity, carrying with it the uncured stock.

Even with such a carrier there is more or less of a tendency for some parts to be stretched more than others, depending on the shape of the mold cavity and in order to completely remove any liability for a greater stretch in one part than in another, with the resulting uneven thickness in the wall of the article produced I vary the thickness of the diaphragm, thickening the part or parts which are liable to excessive stretching. For instance, where the mold is adapted to produce an article of hemi-spherical shape, as per mold section in Fig. 1, the central portion of the sheet tends to stretch more than the outer portions and hence I increase the thickness of the diaphragm toward the center to a sufficient degree to compensate for this increased liability to stretch. The result of this is that the diaphragm stretches uniformly throughout its entire surface, as it is drawn down into the cavity and hence the rubber sheet carried thereby is maintained of uniform thickness.

In order to clamp the diaphragm across the mouth of the mold section I form the same with an annular beaded edge, as indicated at $2^b$, the lower surface of the bead fitting into an annular groove or channel $1^c$ at the edge of the mold section and I clamp this beaded edge in place by a ring 3 fitting into a suitable annular recess $1^d$ in the mold section and having an overhanging flange $3^a$, provided with an annular channel $3^b$ in its under face to engage the upper surface of the bead.

Where the article to be made is a ball, two such mold sections having hemi-spherical cavities are used as shown in Fig. 2, and the rubber sheet is drawn down into these cavities as hereinbefore described, the mold sections being identical except that they are in the form of mating molds, the one having a recess $e$ to receive a corresponding projecting part $e'$. The cavity $1^a$ is not truly hemi-spherical the balance of the hemisphere being made up by the inner surface $3^c$ of the ring which is projected inwardly a distance equal to the thickness of the adjoining portion of the diaphragm so that after the diaphragm is drawn down into the bottom of the cavity in the position shown in dotted lines in Fig. 1 this portion $3^c$ forms a continuation thereof. The upper surface of the ring is shaped to coöperate with the corresponding surface of the ring of the mating mold section to effect the junction of the edges of the uncured stock from which the article is made, and I prefer to so construct these rings that they will not only join the edges of the stock but will cut or trim the same and for this purpose provide the rings with coacting cutting ridges, as indicated at $3^d$.

The mold sections may be brought together by the use of an ordinary hydraulic press, or they may, if desired, be used in connection with rotary carriers or drums, in which event the mold blocks would necessarily be curved to conform to the contour of the drums and the registering surfaces $e, e'$ would only occur at two opposite sides to enable the two mold sections to roll together without binding.

The articles formed by the aforedescribed process are usually provided with a charge of gas forming chemicals in their interior which may be accomplished by inserting the charge into one of the half articles after it has been formed by the unbalanced air pressure and before it is opposed to the other half article.

After these articles are formed they are removed from the forming molds, the elastic diaphragm serving to eject the articles, and are then ready to be placed in separate curing molds where they are vulcanized.

What I claim:

1. The hereindescribed method of shaping plastic sheets which comprises supporting a plastic sheet upon a perforated elastic diaphragm lying across a mold cavity, and then producing a partial vacuum within said mold cavity.

2. The hereindescribed method of forming hollow articles from plastic sheets which comprises supporting a pair of sheets upon elastic diaphragms lying across the cavities of mating mold sections, producing a partial vacuum within the mold cavities to cause said diaphragms to draw the sheets down into the mold cavities, and subsequently bringing said mold sections together to join the edges of the plastic sheets.

3. The hereindescribed method of forming hollow articles from plastic sheets which comprises supporting a pair of sheets upon elastic diaphragms lying across the mold cavities of mating mold sections, drawing said diaphragms and sheets down into the mold cavities by suction, and subsequently severing the shaped portions of the sheets and uniting the severed edges by a single operation.

4. A device for shaping plastic sheets which comprises mold sections having a mold cavity, an elastic diaphragm of varying thickness held across the mouth of said cavity, and means for producing unbalanced pressure upon opposite sides of said diaphragm.

5. A device for shaping plastic sheets which comprises a mold section having a mold cavity, a perforated elastic diaphragm held across the mouth of said cavity, and means for exhausting the air from said cavity.

6. A device for shaping plastic sheets which comprises a mold section having a mold cavity, an elastic diaphragm having a beaded edge, means for clamping said beaded edge to hold the diaphragm across the mouth of the cavity and means for exhausting the air from said cavity.

7. A device of the character described comprising a mold section having a mold cavity, an elastic diaphragm lying across the mouth of said cavity, a clamping ring having its lower face bearing on the edge of said diaphragm and having its upper face provided with a cutting edge, and means for exhausting air from said cavity.

8. A device for forming hollow articles from plastic sheets comprising a pair of mold mating sections having mold cavities, an elastic diaphragm clamped across the mouth of each cavity, means for exhausting air from said cavities, and means carried by said sections for uniting the edges of said sheets when the mold sections are brought together.

9. A device for forming hollow articles from plastic sheets comprising a pair of mold mating sections having mold cavities, an elastic diaphragm clamped across the mouth of each cavity, means for exhausting air from said cavities, and means carried by said sections for simultaneously severing the shaped portions of said sheets and uniting the edges thereof as the mold sections are brought together.

In testimony wherof, I affix my signature.

ISAAC W. ROBERTSON.